United States Patent
Lepanto et al.

(10) Patent No.: US 8,863,156 B1
(45) Date of Patent: Oct. 14, 2014

(54) API WIZARD

(75) Inventors: Robert Lepanto, Stamford, CT (US); Chakra Kosana, Solon, OH (US)

(73) Assignee: AppCentric Solutions, LLC, Stamford, CT (US)

( * ) Notice: Subject to any disclaimer, the term of this patent is extended or adjusted under 35 U.S.C. 154(b) by 175 days.

(21) Appl. No.: 13/343,485

(22) Filed: Jan. 4, 2012

Related U.S. Application Data

(60) Provisional application No. 61/429,611, filed on Jan. 4, 2011.

(51) Int. Cl.
G06F 9/54 (2006.01)
G06F 3/00 (2006.01)

(52) U.S. Cl.
USPC ............................................. 719/328; 707/4

(58) Field of Classification Search
None
See application file for complete search history.

(56) References Cited

U.S. PATENT DOCUMENTS

| | | | |
|---|---|---|---|
| 5,909,570 A * | 6/1999 | Webber | ........................... 703/13 |
| 7,089,245 B1 | 8/2006 | George et al. | |
| 7,308,678 B2 | 12/2007 | Allor | |
| 7,757,234 B2 | 7/2010 | Krebs | |
| 2006/0179070 A1 | 8/2006 | George et al. | |
| 2008/0222708 A1* | 9/2008 | Bhaghavan et al. | ............... 726/4 |
| 2009/0328043 A1* | 12/2009 | Vermette et al. | .............. 718/101 |
| 2010/0325526 A1* | 12/2010 | Ellis et al. | ..................... 715/217 |

* cited by examiner

*Primary Examiner* — Andy Ho
*Assistant Examiner* — Abdou Seye
(74) *Attorney, Agent, or Firm* — St. Onge Steward Johnston & Reens LLC

(57) ABSTRACT

A system for interacting with a database has interface software for enabling communication between a spreadsheet program and a database API. The interface software dynamically reads API parameter information in order to allow a user to select the fields to be added to a loader template. Using the loader template, a user can access the database with the spreadsheet program in order to add, edit or retrieve data from the database.

27 Claims, 8 Drawing Sheets

FIGURE 3A

| | A | B | C | D | E | F | G |
|---|---|---|---|---|---|---|---|
| | API Wizard<br>Streamlining Oracle Data Entry | | | | | Builder | |
| | API Name: | APPS.APPC_API_WIZARD_ASSIG | | | | | |
| 6 | Include | Input/Output API Field Name(s) | Datatype | In/Out | API Field Default Value | Display Position | Display Sequence |
| 7 | Yes | ORG_ID | NUMBER | In | | Show - Header | |
| 8 | | USER_ID | NUMBER | In | | | |
| 9 | | APPLICATION_ID | NUMBER | In | | | |
| 10 | | RESPONSIBILITY_ID | NUMBER | In | | | |
| 11 | Yes | IP_API_SCHEMA_NAME | VARCHAR2 | In | | Show - Sequenced | 1 |
| 12 | Yes | IP_API_PKG_NAME | VARCHAR2 | In | | Show - Sequenced | 2 |
| 13 | Yes | IP_API_PROC_NAME | VARCHAR2 | In | | Show - Sequenced | 3 |
| 14 | Yes | IP_USER_ID | NUMBER | In | | Show - Sequenced | 4 |
| 15 | Yes | IP_USER_NAME | VARCHAR2 | In | | Show - Sequenced | 5 |
| 16 | Yes | IP_RESPONSIBILITY_ID | NUMBER | In | | Show - Sequenced | 6 |
| 17 | Yes | IP_RESPONSIBILITY_NAME | VARCHAR2 | In | | Show - Sequenced | 7 |
| 18 | Yes | IP_ACTION | VARCHAR2 | In | | Show - Sequenced | 8 |
| 19 | Yes | OP_MSG_COUNT | NUMBER | Out | | Show - Far Right | |
| 20 | Yes | OP_MSG_DATA | VARCHAR2 | Out | | Show - Far Right | |
| 21 | Yes | P_RETURN_STATUS | VARCHAR2 | Out | | Show - Far Right | |

150
152
154
156
158
160
162
164

API WIZARD

CROSS-REFERENCE TO RELATED APPLICATIONS

This patent application claims the benefit, under 35 U.S.C. §119(e), of U.S. Provisional Patent Application Ser. No. 61/429,611, filed on Jan. 4, 2011, the content of which is incorporated herein by reference in its entirety.

FIELD OF THE INVENTION

The present teachings relate generally to database systems and, more particularly, to software for dynamically building a spreadsheet-based interface to access database content.

BACKGROUND OF THE INVENTION

Many organizations utilize an enterprise resource management system to manage information about their business. Enterprise resource management systems typically comprise very complex sets of relational databases. Access to the data stored in the databases is tightly controlled in order to maintain referential integrity among the database tables. The complexity of such systems makes it difficult for less technical users to access the information stored in the database.

Many software providers provide APIs (application programming interfaces) that allow authorized users or programs to access data contained in a database. APIs may be provided for particular functions. For example, an API called "add_new_customer" may provide fields for all customer data, which may be stored in multiple tables. The API may execute an attempt to add a new customer but it may not be successful if, for example, required information is not provided. In this way, the API helps to simplify and manage data access, and transactions may only be committed to the database if they satisfy database requirements.

One example of a complex database structure is Oracle E-Business Suite, which is a collection of enterprise resource planning (ERP), customer relationship management (CRM), and supply-chain management (SCM) applications that utilize Oracle's relational database management technology. Oracle also provides a number of APIs for allowing data to be requested from the database or added to the database in particular formats.

Software applications, such as ERP applications, typically provide standard forms for accessing information. However, these forms can be confusing and difficult to work with. As a result, organizations and end-users often create customized applications that utilize APIs to provide a user-friendly way to access the database information. However, creating and maintaining these applications can be expensive and difficult.

Therefore, it would be beneficial to have a superior system and method for working with APIs.

SUMMARY OF THE INVENTION

The needs set forth herein as well as further and other needs and advantages are addressed by the present embodiments, which illustrate solutions and advantages described below.

The system of the present embodiment for accessing a database on a server computer includes, but is not limited to: interface software in electronic communication with a spreadsheet program executing on a user computer, the interface software also in electronic communication with an API for the database; a builder template usable by the spreadsheet program, the builder template configured by the interface software to have fields corresponding to parameters for the API; and a loader template usable by the spreadsheet program, the loader template configured by the interface software to have fields corresponding to fields selected on the builder template defining the configuration of the loader template. The interface software builds an API execution statement using user data added to the loader template. The interface software sends the API execution statement to the API for execution.

Another system according to the present teachings for accessing a database on a server computer includes, but is not limited to: first interface software executing on a user computer and in electronic communication with a spreadsheet program executing on the user computer, the first interface software also in electronic communication with an API for the database; second interface software executing on the server computer and in electronic communication with the database and the first interface software, the second interface software facilitating communication between the database and the first interface software; a builder template usable by the spreadsheet program, the builder template configured by the first interface software to have fields corresponding to parameters for the API; and a loader template usable by the spreadsheet program, the loader template configured by the first interface software to have fields corresponding to fields selected on the builder template defining the configuration of the loader template. The first interface software builds an API execution statement using user data added to the loader template. The first interface software sends the API execution statement to the API for execution. The first interface software indicates on the loader template whether a row or rows (e.g., table type parameters, etc.) of data was successfully executed by the API. It may also provide other output parameters and messages from the API, although not limited thereto.

The method of the present embodiment for using a system to access information in a database on a server computer includes the steps of, but is not limited to, building an API execution statement with the interface software using user data added to the loader template; and sending the API execution statement to the API for execution. The method may also include the step of communicating (e.g., transmitting, etc.) any output parameters and/or messages from the API to the calling program (e.g., loader template, web form, vb form, etc.).

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

BRIEF DESCRIPTION OF THE DRAWINGS

FIGS. 3A-3C are illustrations depicting one embodiment of the user interface according to FIG. 1;

DETAILED DESCRIPTION OF THE INVENTION

Figure 1:
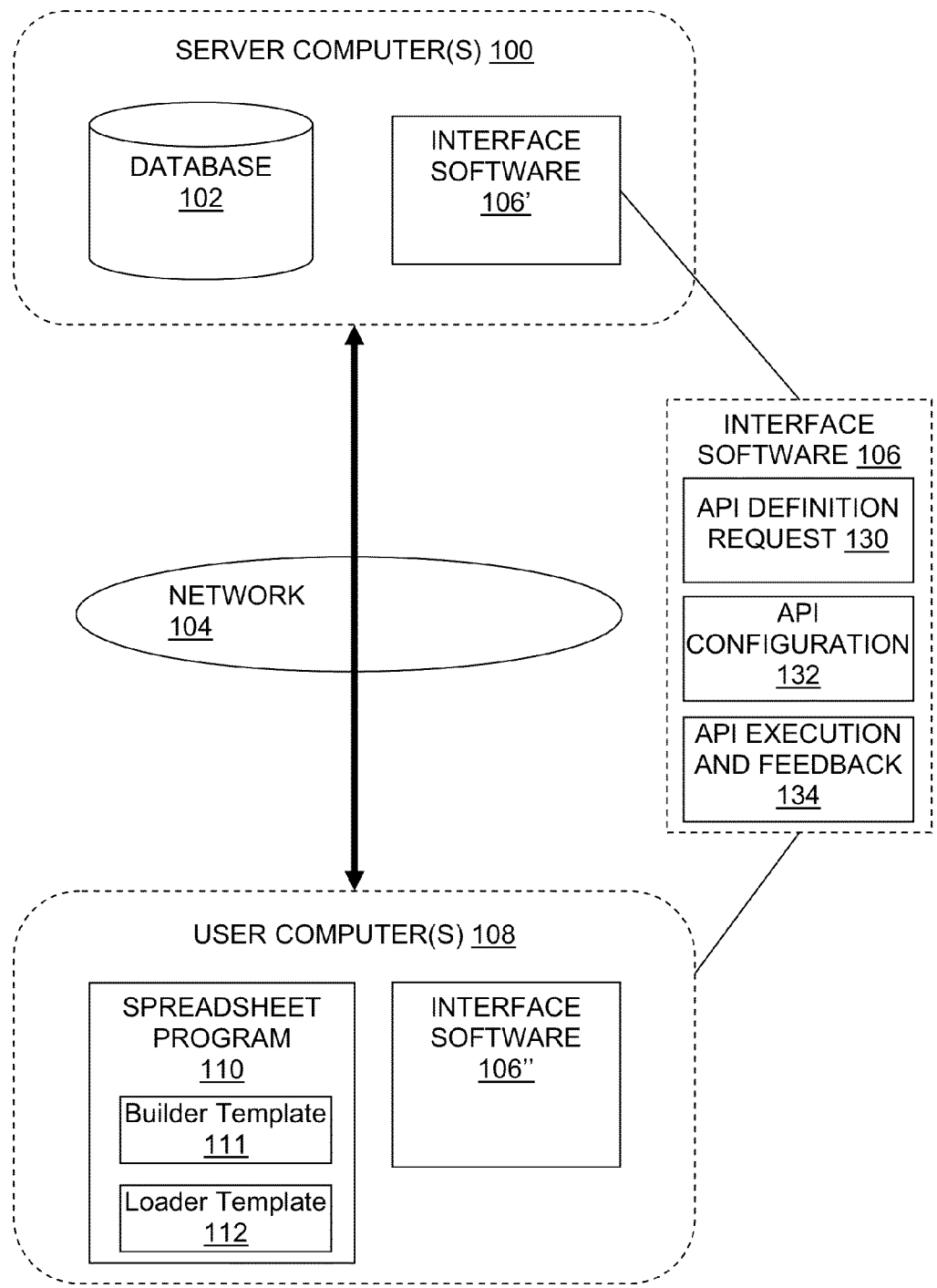
FIG. 1 is a diagram depicting one embodiment of the system according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In one embodiment, a system according to the present teachings comprises a server computer, a database, a user computer having a spreadsheet program, and an interface program that facilitates the exchange of data between the database and the spreadsheet program. One objective of the present teachings is the ability to dynamically interpret and interact with databases using their APIs (application programming interfaces). The interface program may accomplish this by reading API information from the database and creating spreadsheet templates. Specifically, a "builder template" may be used to read database information and help construct a "loader template" for exchanging data with the database. Such a system may streamline data entry and reporting.

Many organizations utilize an enterprise resource management system that comprises a complex database structure. Such systems may provide APIs (application programming interfaces) for allowing data to be requested from the database or added to the database in particular formats. In one embodiment, a system according to the present teachings may interpret these APIs, allowing users to use a spreadsheet program as the user interface (e.g., front end, etc.) of their database, without requiring programming tailored to specific APIs. Although the present teachings are discussed in relation to resource management systems and spreadsheet front ends, the system according to the present teachings could be utilized for any database using any number of different front ends and the present teachings are not limited to any particular embodiment disclosed herein.

Spreadsheets may serve as the front end user interface for just about any e-business suite having data entry requirements. The current system is useful for entering data required by day-to-day recurring business processes, special high-volume projects and complex data conversions, although not limited thereto. It may streamline processing and reduce the time and effort required to prepare, enter, and support the entry of data. It may also greatly simplify reporting.

The benefits of such a system include, although not limited thereto: it easily loads data from spreadsheet to a database; it is more efficient than standard forms and custom upload processes; it may work out of the box with predefined public database APIs; it may be capable of working with custom APIs; it may allow IT personnel to delegate functionality to users as appropriate; and it may drastically shorten development timelines and costs.

Some of the various database tasks such a system may be useful for include, although not limited thereto: receipt (cash) application; credit/debit memos; disputes; applying/relieving holds; supplier entry and updates; supplier site entry and updates; customer entry and updates; customer address entry/updates; bank entry/updates; bank statements; payment batches; OM orders; OM quotes; OM returns; purchase orders; blanket POs; receipts; requisitions; inventory item maintenance; material transactions; replenishments; physical inventory updates; payroll; project transactions; project budgets; time and expense; IB transactions; contracts; sales leads; sales reps; commission (comp) plans; comp rate tables; comp formulas; comp expressions; comp adjustments; comp manual orders; journal entries; GL accounts; user management; value set values; project entry; project maintenance; HR applicants; HR people; HR employees; HR assignments; organizations; business units; legal entities; operating units; marketing campaigns; comp workbench; assets—creation/changes; asset retirements; asset transfers; master lease agreements; vendor lease agreements; lease contracts; lease maintenance; collections; credit requests; trading community; BOMs; BOM security rules; BOM imploder/exploder; item costs; manufacturing routing; service charges; service contracts; warehouse mgmt; catalogs; on-hand inventory balance; pick release/wave; transfer reservations; inventory lots; item categories; item types; territories; etc.

Standard data entry forms provided with database software applications (including ERPs, etc.) can be confusing, difficult to work with, and inflexible. Thus, businesses face a choice to enter data, whether to use such standard forms or create and maintain custom forms or custom file upload processes of one kind or another. Faced with these options, it is not surprising that most organizations cobble together a patchwork of inefficient processes to deal with the variety and volume of data entry challenges that exist across typical e-business suites. The current system may leverage the familiarity, flexibility and feature set of spreadsheets (or other programs) to create an environment to streamline data entry and management. With features that ease data preparation and entry (including lists of values, easy to understand database messaging, error correction, etc.), the system may provide a platform for highly efficient data entry and management.

In one embodiment, the system utilizes a template system. Templates may be spreadsheets that have been tailored to fit the needs of a particular data entry task so data can be easily entered in volume as spreadsheet records. An organization may create templates through a GUI-driven process and make them available to authorized users. Little or no programming may be required to configure a template to put a spreadsheet front end on any public database API. In such a way, the system may enable IT to easily provide pre-configured templates to those who enter data. Over time, an organization may create a library of templates that are precisely tailored to specific data entry needs.

Another aspect of the current system is its reporting capabilities. In one embodiment, the system provides an easy to use, user-friendly GUI through a spreadsheet and from within the spreadsheet program a user may see a list of available reports (e.g., reports the user is authorized to run/view, etc.), and run a report or enter preferences such as filters, sort order, etc. Results may then be displayed in the spreadsheet in pre-formatted worksheets (e.g., which might have color preferences, number formatting, etc.), although not limited thereto.

In one embodiment, a report developer can set default values and control which fields will serve as user parameters (if any). The report builder may set the default worksheet to display in, the number of records to allow before prompting the user to approve, whether to include gridlines, auto-fit column width, etc., although not limited thereto. The user may also have the ability to adjust these settings before running a report. With report output in spreadsheet format, users can easily analyze data as well as use the report output to feed or combine with other spreadsheets (e.g., Excel workbooks, etc.). This provides an integrated spreadsheet-based solution.

The reporting functionality can be used both as a mechanism for creating worksheets with data to be used in data updates or for performing standard reporting, although not limited thereto. Seeding worksheets for data updates (e.g., modifying data retrieved using a report) can be very useful. For example, if a user wants to update the default payment terms for all vendors in a database with a vendor class of 'Service', he or she could use a report to pull only those vendors into the loading worksheet, review and change payment terms for each vendor as desired, and then use system to make those changes in the database.

Additionally, because the data entry/update and reporting may be integrated into one database session, a user can run reports which show what the data will look like before those changes are committed to the database. The reporting functionality is flexible and can meet a wide variety of an organization's specific reporting and analysis requirements while supporting corporate policies and procedures for handling sensitive business data.

In one embodiment, the system leverages public API architecture to perform supported business processes. Application providers may create and maintain public APIs as a preferred and supported method for entering external data into their databases. The term "API" includes any software program that can be, for example, a database stored procedure or function. In a preferred embodiment, an API is a program that allows a user to perform certain functions, such as entering invoices, updating item information, creating new employees, etc., although not limited thereto. For example, Oracle has released thousands of "public" APIs to be used by Oracle customers for loading or maintaining data in an Oracle database. These public APIs are supported by Oracle as an approved mechanism for data entry and update. An API can also be a custom program developed by an IT department or a third-party vendor, although not limited thereto. The current system makes APIs accessible via a spreadsheet-based GUI, although not limited thereto.

APIs help to insulate a user from the need to fully understand the database structure. For example, APIs may manage the inter-table relationships and maintain the integrity of the database. When necessary, database row level locks may be used to ensure consistency between different tables and to prevent invalid data from being entered into the system. When an API is called, either the whole transaction may be successful and all the individual database changes will be applied or the complete transaction fails and the database is left in the starting valid state, although not limited thereto. This provides flexibility between individual record and batch processing. It also ensures that the standard commit processing carried out by client programs is not affected. APIs also help to protect any customer-specific logic from database structure changes.

There are multiple software programs, program routines, and subroutines used to achieve the desired results. These are described below in relation to the Figures. Communication protocols and technologies are not discussed in detail as they represent a technical detail and are not critical to the present teachings. There are any number of communication protocols that can be used to adequately support server/server, client/server, etc. communications as one skilled in the art would readily appreciated.

Referring now to FIG. 1, shown is a diagram depicting one embodiment of the system according to the present teachings. In one embodiment, the system may comprise one or more server computers 100 having one or more databases 102 and interface software 106'. The server computer 100 may "serve" functionality such as software and access to the database 102 to one or more user computers 108 over a network 104, although not limited thereto. For example, the one or more server computers 100 may comprise an "Application" server where some components of application logic reside. In one embodiment, the network 104 is the Internet.

The user computer 108 may include a spreadsheet program 110 (or other program for providing a graphical user interface to the database 102) and interface software 106", although not limited thereto. The user computer 108 may communicate with the server computer 100 in order to access database 102 features with the spreadsheet program 110 and interface software 106. This may allow, for example, a user to utilize a spreadsheet to perform data updates or create reports from the database 102, discussed further below. The database 102 and/or interface software 106" may comprise one or more APIs (application program interfaces) in order to facilitate communication with the database.

The interface software 106 may comprise one or more software modules that may be executed on behalf of the server computer 100 and/or user computer 108, although not limited thereto. For example, in one embodiment, the interface software 106 may comprise interface software 106' on the server computer 100 as well as interface software 106" on the user computer 108, although not limited thereto. In this way, interface software may communicate with the database 102 and the spreadsheet program 110 in order to facilitate communication and data transfer, although not limited thereto. In one embodiment, interface software 106" may comprise an API and/or other custom programming and interface software 106' may comprise a macro and/or other custom programming, although not limited thereto.

The functionality of the interface software 106 will be discussed more in detail below in reference to FIGS. 4-6. In one embodiment, the interface software 106 comprises API definition request 130, API configuration 132, and API execution and feedback 134 functionality, although not limited thereto. This functionality may be used to construct a builder template 111 (shown in FIG. 3A), which may in turn be used to construct a loader template 112 (shown in FIG. 3B) for exchanging data with the database. So designed, the system may provide a user interface (e.g., using the spreadsheet program 110 or some other program) that allows a user to send new data or updates to existing data as well as retrieve information/report data from the database 102.

It is to be appreciated that the exemplary embodiment depicted in FIG. 1 is but one particular embodiment and the present teachings are not limited thereto. For example, a spreadsheet program 110 is not critical to the present teachings and any number of additional programs (e.g., word processing program, user form, web application, custom software, personal information manager, etc.) may be utilized to provide a user interface. These may be generally referred to as "user interface programs." In addition, the templates (e.g., builder template 111, loader template 112, etc.) used to dynamically interact with the database are not limited to spreadsheets or any particular type of document. As a result, they may be generally referred to as a "builder process" and a "template process." What is desired is programming that provides for dynamic interaction with the database and one skilled in the art would appreciate the various technologies that may be utilized to provide a system according to the present teachings. Accordingly, the present teachings not intended to be limited to any particular embodiments described herein.

Figure 2:
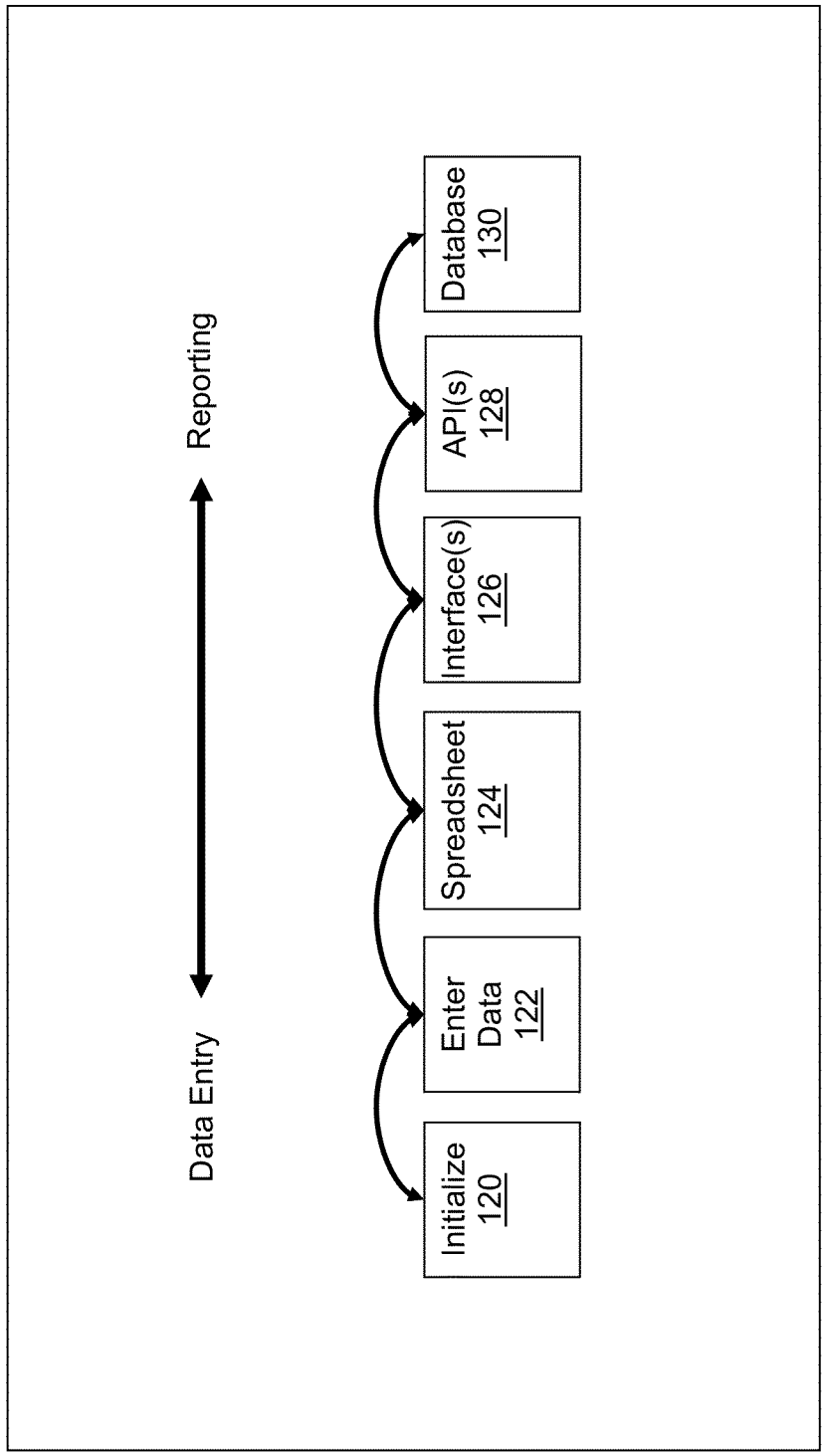
FIG. 2 is a diagram depicting one embodiment of data flow according to the system of FIG. 1.

Referring now to FIG. 2, shown is a diagram depicting one embodiment of data flow according to the system of FIG. 1. Using a system described herein, a user may easily interface with a database to perform a number of activities including data entry and reporting, although not limited thereto. As shown, a user may enter data 122, which may be in a user interface program such as a spreadsheet 124, although not limited thereto. This data may be processed (e.g., sent, used, etc.) by the interfaces 124, to any APIs 128 and to the database 130, although not limited thereto.

Similarly, a user may request data from the database 130, such as for reporting, etc. In this way, data may travel from the database 130, through any APIs 128, interface(s) 126 and to a user interface such as a spreadsheet 124, although not limited thereto. The user may then utilize the spreadsheet to manipulate the data and/or export it to another program. It is also to be appreciated that the system may require some initialization 120 in order to determine the format of the user interface, for example, to create a loader template to accommodate particular data fields for a specific API 124, although not limited thereto.

Figure 3B:
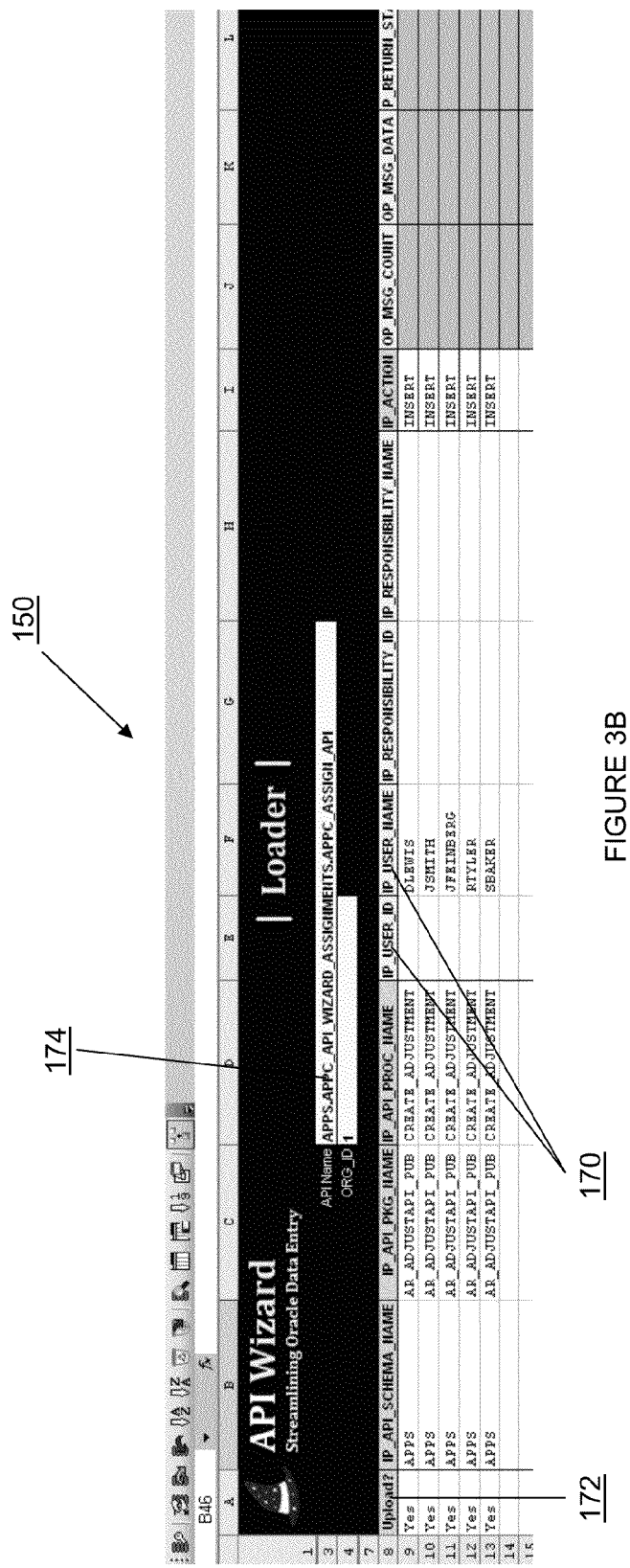

Referring now to FIG. 3A, shown is an illustration depicting one embodiment of the builder template user interface according to FIG. 1. The user interface according to the present teachings may be provided with a spreadsheet 150, although not limited thereto. As shown in FIG. 1 and described in detail in FIGS. 4 and 5, an API definition request may be used to access the database and API configuration may result in the identification of the API parameters. In this way, the system may dynamically create a loader template (e.g., spreadsheet, etc.) for a particular API as shown in FIG. 3B, although not limited thereto. The builder template may be one component of the present teachings, with another component being the loader template used for exchanging data with the database, although not limited thereto. The builder template may build a loader template by adding spreadsheet column names, parameter types, and data requirements required for a particular API, although not limited thereto.

From the user interface (e.g., spreadsheet 150, etc.), a user may connect with the database in order to determine the availability of any APIs. This may be accomplished using a popup window, although not limited thereto, which may provide a list of all available APIs (e.g., public, private or custom, etc.). Once a user identifies an API, such as by selecting it from a list, the system may generate the metadata for the API for configuration of a builder template. The spreadsheet 150 may provide a place for the API name 152, although not limited thereto. This may pre-fill after a user has selected the API from available APIs or the user may type in the name, although not limited thereto. Once an API has been selected, its parameters may be displayed in the API builder template as shown.

API parameters may be configured as "Header" level parameters or "Detail" level parameters, although not limited thereto. "Header" level parameters are parameters that will have the same value for all records in a given API execution. For example, if an API has "GL_Date" as a parameter and a user will always be loading records in a given API execution in the same period, the GL_Date value may be entered only once as a header level value and it will be passed with every record to the API. This saves needless data entry and simplifies the data layout in the API loader template (shown in FIG. 3B). "Detail" level parameters may be those parameters that will be entered for every record passed to the API.

The builder template (spreadsheet 150) may have a number of columns for building a loader template. An "Include" column 156 may control whether an API parameter should be part of the loader template to be created. It may also have an API parameter name column 154. A datatype column 158 may provide the datatype of the API parameter. For composite data types such as tables, records, and arrays, the scalar sub-type may be presented. An In/Out column 160 may indicate whether the parameter is an input or an output to the API. In/Out parameters may be listed as In parameters. An API field default value 162 may provide a default value. A display position column 164 may indicate how the field should be displayed in the loader template. For example, it may be a header type parameter, a detail type parameter for which the user defines the order to be presented in the loader template, or a detail type parameter with location on the loader template determined based on the order the API is defined in loader. Finally, a display sequence column 166 may indicate the position in which the field should display. The numbering for header and detailed records may be independent of each other, so both may start with the #1, although not limited thereto. The records may be sorted by the sequence, so they can start and end with any number. The columns described above are exemplary in nature and the present teachings are not limited thereto.

Each API parameter 154 may be displayed in a specific spreadsheet row. To select a parameter to be included in the API configuration, a user may simply double-click it, although not limited thereto. The entire row may then display in a light blue color and the 'Include' column 156 may display the value 'Yes', although not limited thereto. Double-clicking a row a second time 156 may de-select it. A user may also simply type 'Yes' into the Include column or copy/paste 'Yes' into multiple records.

Once the user is finished defining the configuration for the loader template, he or she (or another computer program) may instruct the system to build the loader template. Once generated, the user may modify the loader template as necessary. For example, columns may be color coded (e.g., different colors for required vs. optional fields, etc.), rearrange the columns, or hide columns to simplify the loader template, although not limited thereto.

Before the loader template is created, a user may be asked if he or she wants to include the pop-up commit/save dialogue box at the end of each API execution, although not limited thereto. If a user chooses "yes", then each time an API execution completes (could be 1 row or 100,000 rows), a pop-up box may be displayed and ask the user if they'd like to commit/save their data to the database. If the user selects "yes" again, then a commit is executed. If they select "no", the pop-up may ask if they would like to issue a rollback. If "yes", then a rollback may be executed. If "no", then the data may stay active in the session.

Referring now to FIG. 3B, shown is an illustration depicting one embodiment of the loader template user interface. A configuration may be specific to an API and define the parameters (e.g., data fields, etc.) that will be entered and how those parameters will be organized in the loader template for the given API. A loader template may be an Excel worksheet that is created dynamically during the configuration process to work with a particular API, as shown in FIG. 3A, although not limited thereto.

A loader template may be used to load a single record of data or tens of thousands of records. The loader template may be used once (in the case of a single data conversion) or repeatedly (e.g., daily or occasional data entry, etc.). Users can prepare data in a loader template over the course of a day or several days and execute the API at their convenience. Users may also make copies of the loader template, saving these like any other spreadsheet file to support their particular processing needs.

As mentioned above in relation to FIG. 3A, the setup of the loader template may occur during the creation process. That process provides great flexibility in terms of the included parameters, the ordering of the parameters, and the look and feel of the loader template (including colors, fonts, font sizes, etc). APIs can be executed directly from within the loader template. Both EBS authentication and explicit permission to execute the API may be validated before the API is executed. Output messages from the API may be returned to the loader template, creating a full feedback loop for the user and enabling review of any issues in order to prepare fixes without needing to involve IT.

User data may be entered into the loader template in the form of "Records." A record is the information required for a single API execution. For most APIs, a record is a row in the spreadsheet. A single record will typically have data in multiple cells, with each cell storing the data for one API parameter. The total number of records passed to an API at one time may be called the "Record Set."

Parameter names 170 for an API may be columns in the loader template. These may be selected during the loader template creation as shown in FIG. 3A. The loader template may also have an "Upload?" column 172 that may determine whether a given row will be included in an API execution. This may allow a user to enter multiple records in the loader template but only run the API for a subset of those records. Additionally, when an API execution for a given record completes successfully, the value in the 'Upload?' column may default to null. When an API execution for the given record fails, the value in the "Upload?" column may remain "Yes". In this way, if the API is submitted again, only the failed records will be resubmitted. The user can change the value of this column at any time. Valid values may include "Yes", "No", and null, although not limited thereto, where both "No" and null may mean the same thing, which is to not process that row.

A "Load Status" column (not shown in FIG. 3B) may be an API wrapper output parameter that indicates whether the system was able to successfully call the requested API (regardless of API return status). A "Messages" column (not shown in FIG. 3B) may be an output parameter that provides any specific error messages to the user.

Header-level parameters may be displayed at the top of the API loader template, outside of the main spreadsheet grid, although not limited thereto. As shown, there are two header-level parameters: 'API Name' 174 and 'ORG_ID'. Any parameter defined at the header level may be passed to the API with the same value for every detailed record entered. One goal of this feature is to eliminate the need for the user to enter repetitive data on every individual record line. In addition to the examples provided, typical header-level parameters might include user name or gl_date (if all transactions in a given API execution will use the same GL_Date), as well as any parameters which are common for a particular API. These values may be changed for every API execution. The rows which hold the header-level parameters can also be hidden, using standard spreadsheet functionality, so that the user does not have to see them.

Character and numerical data can be entered just like entering any character or numerical data into a spreadsheet. Additionally, null values can be passed to an API by leaving a cell blank. A blank cell means that no data has been entered, including non-visible data such as blank spaces. To ensure that a cell is in fact "empty", a spreadsheet "Clear Content" feature may be used. Standard spreadsheet functionality, including copy/paste, dragging, formulas, etc. may be used to streamline and simplify data entry. The loader template may look at the value in the cell when building the API call and not take into account any formulas or special editing being used, although not limited thereto.

Figure 3C:
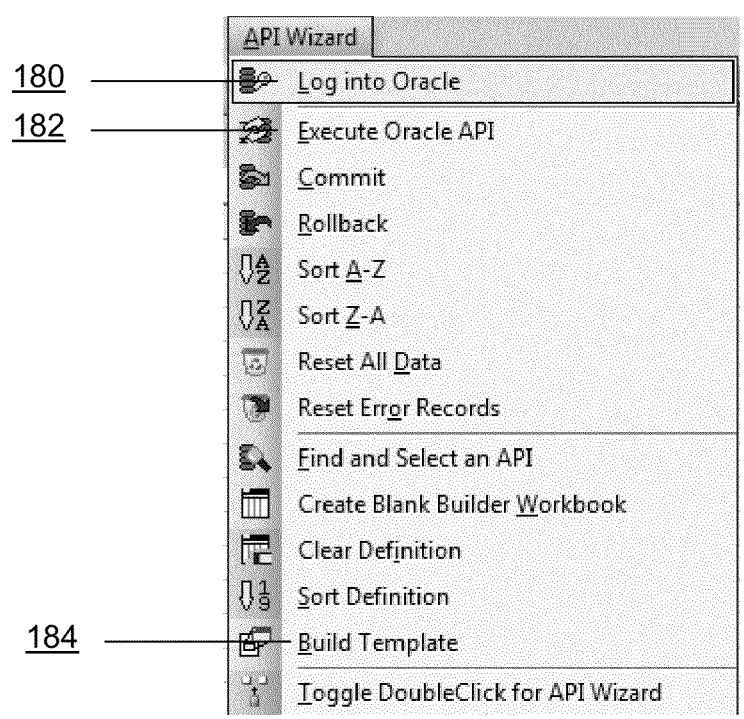

After all of the records in a record set have been entered, the API may be executed by clicking the 'Execute API' button (shown in FIG. 3C). Once that button is pushed, the system may determine how many records are to be processed and may provide a notification to the user displaying the record count and asking for a confirmation to continue. If the confirmation is not provided, the API may not be executed and focus may be returned to the loader. If confirmation is provided, then the API may be executed for all of the records in loader template where the "Upload?" column is set to "Yes", although not limited thereto.

As each record is processed, output parameters may be returned from the database. Output parameters are parameters used for passing data back to the loader template. Output parameters may be part of a record and populated by the database during API execution and passed back to the user upon completion of the API. Output messages often indicate whether the API execution was successful as well as any other necessary information. Most APIs provide actionable information on an API error so that the user can remedy and resubmit. If an API uses one or more output parameters to indicate whether API execution was successful, such as the Oracle EBS standard coding convention of having a p_return_status parameter, the loader template may change the color of the spreadsheet record after execution based on the status in those fields. For example, when the p_return_status output parameter equals "S", the entire record may be displayed in blue text after API execution. If the status equals "E" or "Error", the entire record may be displayed in red text. This makes it easy to visually identify failed records. It is to be appreciated that any output parameter may be used and the present teachings are not limited to any particular embodiment disclosed herein. Records can also be sorted by an output parameter field, such as p_return_status, in order to put all of the failed records together to simplify data correction.

Two output parameters, Load Status and Messages, may indicate whether the system was able to successfully call the API. It is possible for the system to return a successful status but have the API return an error. If the output parameters indicate an error, the data entered should be reviewed. The most common cause for this type of error is a datatype mismatch (e.g., character data in a numerical field, etc.). If there is a data mismatch error, the data can be corrected and the API resubmitted. The output parameters can also be "hidden" in the loader template if the user does not wish to see this output, using standard spreadsheet functionality.

If particular records fail API validation, they may be highlighted in red (if one of the special output parameters is used). The user can easily sort records based on one of the output fields and quickly identify all records which have resulted in an API error. The user can fix the errors in the same worksheet and then resubmit the API. There is no need to clear out the successful records since they will not be reprocessed unless the value in the "Upload?" column for that record equals "Yes".

Referring now to FIG. 3C, shown is an illustration depicting one embodiment of the user interface according to FIG. 1. As shown, the interface software (106" shown in FIG. 1) may provide a tool bar and/or menu items to control functionality, although not limited thereto. Functionality may include logging into the database 180, executing an API 182 and building a loader template 184, although not limited thereto.

Logging into the database 180 may require a database (e.g., Oracle EBS, etc.) username and password. Upon successful sign-in, the user may be able to execute those APIs to which they've been granted permission. If a user attempts to execute an API for which they are not authorized, they may receive an error message indicating a lack of privilege. The error message may be displayed in the "Messages" output parameter for any records included in the execution request. The error message may indicate that the user does not have access to run the given API. Sign-in may also be required for configuring APIs although there may not be a limitation on which APIs can be configured (as there is little security risk associated with creating an API configuration).

A system administrator may have the ability to assign APIs to either users or particular responsibilities. When an API is assigned to a responsibility, any user with that responsibility may run the assigned API. When APIs are assigned to users, then those APIs can only be run by users who have explicitly been granted permission. The administrator(s) may have the ability to run an "API Wizard Assignment" API to assign APIs to users and responsibilities. The system may provide this in a pre-configured template for the "Assign API" API.

In order to run the assignment API, a user may enter an API name and one or more of the following: user_id, user_name, responsibility_id, responsibility_name, and an "action" (e.g., Insert, Delete, etc.), although not limited thereto. An output message may indicate if the API has been successfully assigned. The API output may notify the user if the assignment already exists. The privilege to run the "Assign API" API may be granted to the individual(s) who will serve as administrator(s) or can be later assigned.

The system may have the ability to keep a record of all API executions. This feature is generally used when there are auditing needs above and beyond typical industry requirements. The system may provide three audit modes as determined by the system administrator, although not limited thereto: 1) Always Audit (every transaction is recorded); 2) Never Audit (Auditing is turned off); and 3) Rules Based Auditing (Auditing can be enabled for specific APIs).

The administrator can enable Rules Based Auditing for specific APIs by running a Rules_Based_Auditing_API API, although not limited thereto. For example, only API executions where data is added to the database may be recorded, or all API executions that relate to certain confidential information may be recorded, although not limited thereto. When Auditing is enabled (e.g., Rules Based, Always Audit, etc.), a copy of every record processed in API Wizard may be inserted into an audit table (e.g., apiw.apiw_audit). This may include both the data entered by the user as well as any messages returned by the database.

Figure 4:
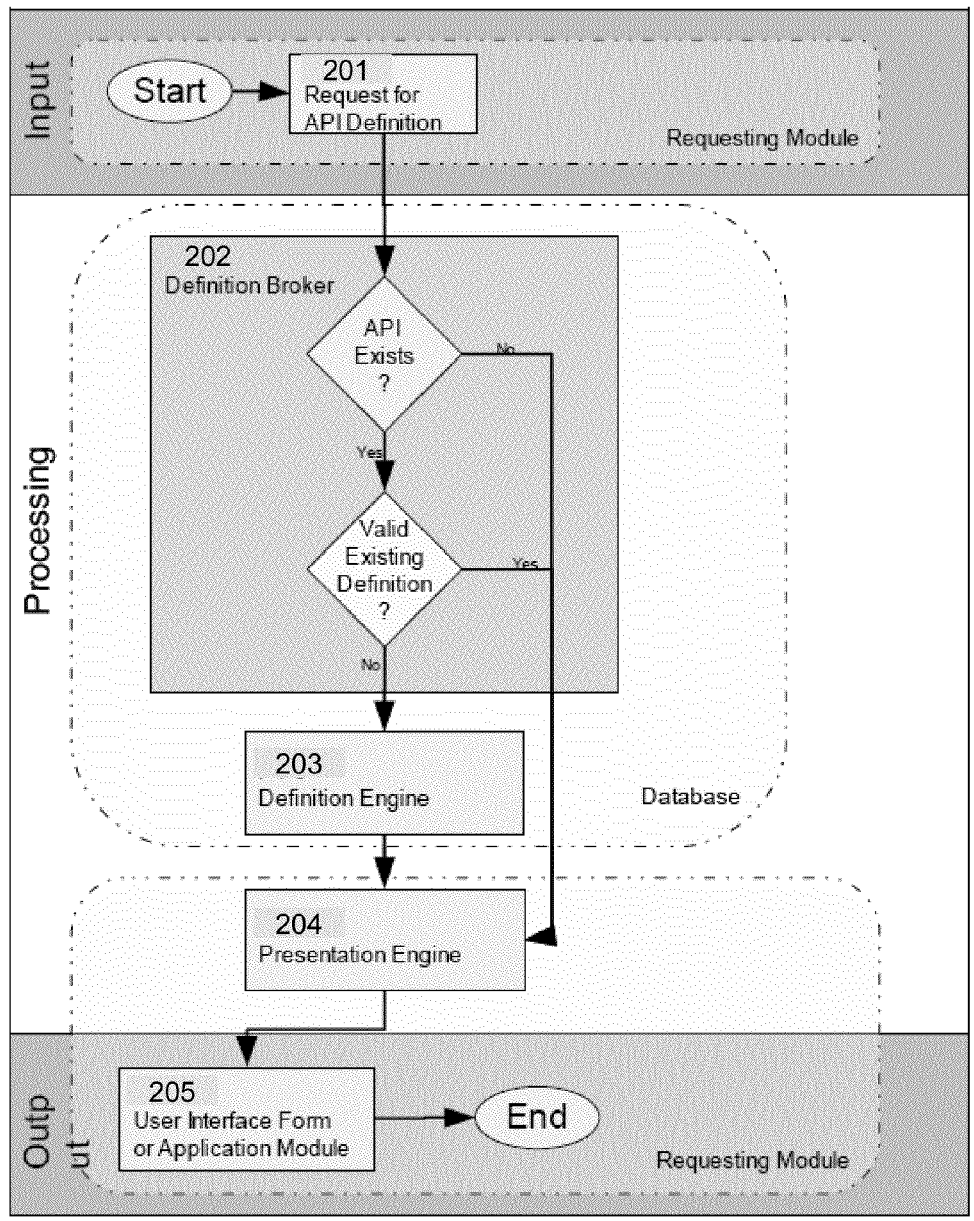
FIG. 4 is a flowchart depicting one embodiment of the API definition request according to FIG. 1.

Referring now to FIG. 4, shown is a flowchart depicting one embodiment of the API definition request according to FIG. 1. As shown, the process may start with a request for definition 201. This request may come from a user interface or from another program. The user interface may be a client-based spreadsheet, a web page (e.g., intranet, Internet, etc.), or a forms-based client software (e.g., Microsoft VSTO, Visual Basic, etc.), although not limited thereto. A request for definition may include an API name and the API owner's name (e.g., a database schema, etc.), although not limited thereto. The definition request may be used to set up a loader template for accessing the database, discussed further below.

The request for definition 201 may be passed to a "Definition Broker", which may have responsibility to determine whether the API to be defined exists. If the API does not exist (e.g., cannot be found based with supplied information, etc.), then an "API not found" message may be sent to a Presentation Engine 204, although not limited thereto. If the API does exist, then the Definition Broker may determine if the API has been previously defined and if that previous definition is still valid (e.g., based on definition date compared to the last time the API was modified, etc.). If the definition exists and the definition is still valid, then the existing definition may be passed to the Presentation Engine 204 for further processing. If the definition exists but is not valid, then a Definition Engine 203 may be called. It may not be necessary to check for an existing definition. Another option is to generate the definition at runtime. However, using a valid, previously defined definition may provide a useful performance benefit.

The Definition Engine 203 may determine the definition of the API. The "definition" of the API in the context of the present teachings includes information needed to configure and call the API. For scalar data types, this may include parameter names, parameter data types, and parameter mode (input/output/in-out), although not limited thereto. For non-scalar data types, the definition may include the parameter name and non-scalar datatype, all non-scalar subtype parameter names and datatype(s), and the eventual scalar subtype parameters, datatype(s) and mode(s), although not limited thereto. Such information may be determined by querying a data dictionary, which may store information on each parameter for every API. The results of the data dictionary query may be formatted for communication to the presentation engine 204, although not limited thereto. This formatting may allow hierarchical parameter structures to support the non-scalar data types which can be accomplished using XML, intelligent character/delimiter stringing (e.g., using special delimiters or logic to express the hierarchical structure, etc.), or database record types, although not limited thereto. The definition may be stored in the database for faster retrieval if/when the definition is requested again or if the API is executed, although not limited thereto.

The presentation engine 204 may receive input (e.g., API definition or the "API not found" message, etc.) and perform additional formatting to meet specifications of the calling program. For example, when the calling program is a user form (e.g., a spreadsheet, visual basic, etc.), the presentation engine 204 may be responsible for updating the user interface with the API definition. This can occur on a server (e.g., if output is being presented to another database or database program, a web server, some other server side process, etc.) or on a client (e.g., client spreadsheet program, etc.), although not limited thereto.

The process depicted in FIG. 4 may end once the requesting module (e.g., user-interface form, application module, etc.) has been updated with the API definition or the "API not found" message, although not limited thereto. If the API definition is received, then the requestor can move forward into a subsequent process, discussed further below. If an API definition error is received, the process may be repeated if desired with another API name, although not limited thereto.

Figure 5:
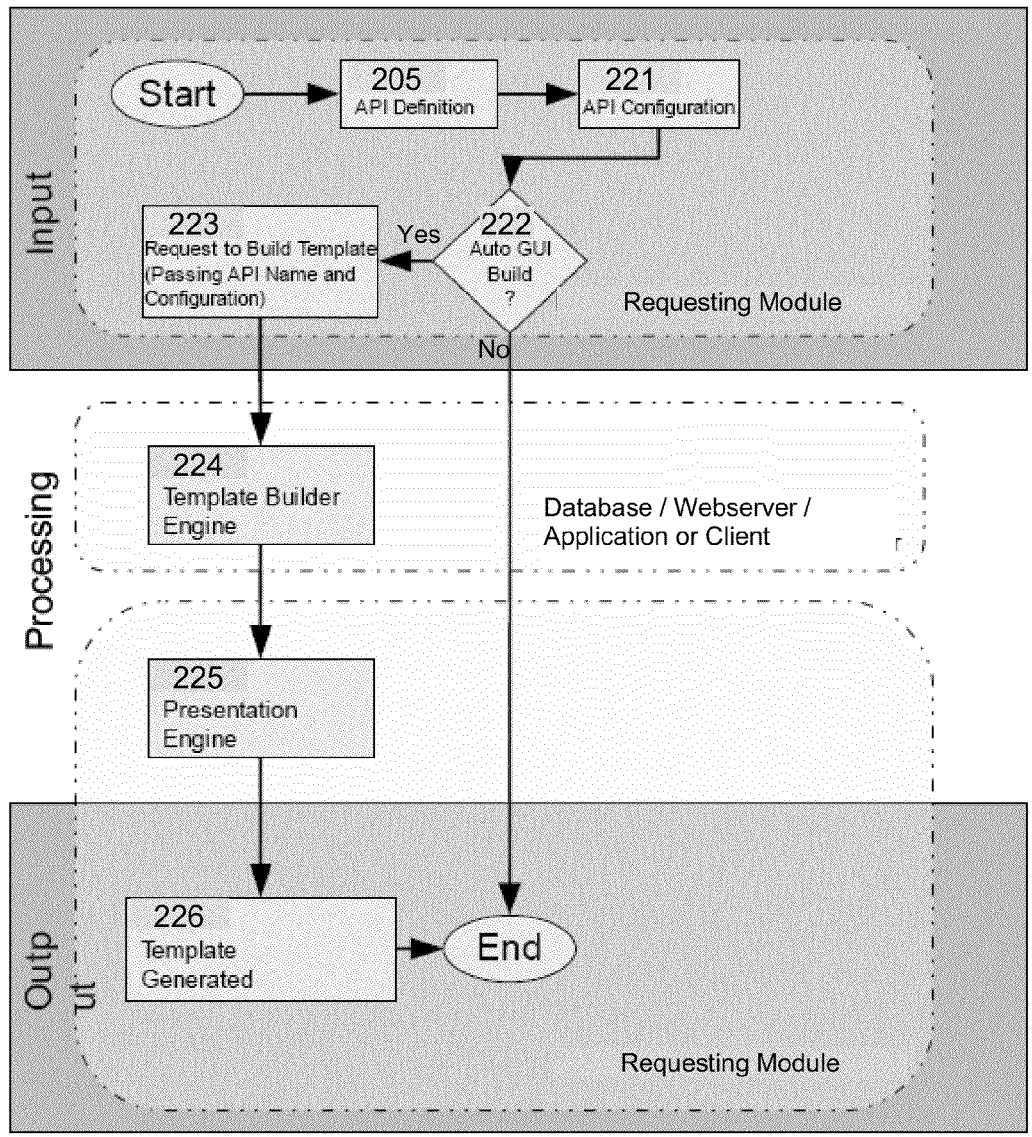
FIG. 5 is a flowchart depicting one embodiment of the API configuration according to FIG. 1.

Referring now to FIG. 5, shown is a flowchart depicting one embodiment of the API configuration according to FIG. 1. This process may utilize a valid API definition as an input and the API definition 205 (also shown in FIG. 4) presented to the requesting process may be the starting point, although not limited thereto. API configuration is a step which may be performed manually by a user in a graphical user interface designed for recording the configuration information or within the code of an application program, although not limited thereto. API configuration results in the identification of the parameters which will be included in the creation of a loader template 225, discussed further below.

The API definition 205 may include the set of parameters for the API, although not limited thereto. This may also include any processing or formatting options, such as whether to provide a commit dialogue box, although not limited thereto. The API configuration 221 may minimally include the API name and the parameters to include in the configuration. Additionally, formatting instructions may be included if required for the look and feel of the user interface (e.g., if a user interface will be created), potentially including the positioning of API parameters within the user interface, although not limited thereto. Datatype information may also be utilized for proper formatting, although not limited thereto.

The system (or user, etc.) may determine whether to perform an auto GUI build 222. If Yes, then it may request to build template 223. The request to build a template 223 may include an API name along with configuration data to be included in the template. If the template will be retained on a server (e.g., web server implementations or if the template needs to be stored in database to support more efficient processing, complex configurations, etc.), then the template builder engine 224 may dynamically create and save the template definition. Once the template is created, then it may be passed to the presentation engine 225. The template builder engine 224 may also reside on a client, although not limited thereto.

A loader template may be a dynamically generated user interface for executing the API from within a spreadsheet, visual basic or VSTO form, web page, or some other GUI accessible by users, although not limited thereto. This process may dynamically create a user-enterable, reusable form based on the parameter name and configuration data passed as an input parameter. The specific formatting is not particular to the invention, however, the user interface may be built dynamically and the user may not have to perform any programming in order to use the loader template. Once a loader template has been generated 226, it can be saved on a local (non-server) computer or any type of server, e.g. a fileserver, web server, or database server, although not limited thereto.

Figure 6:
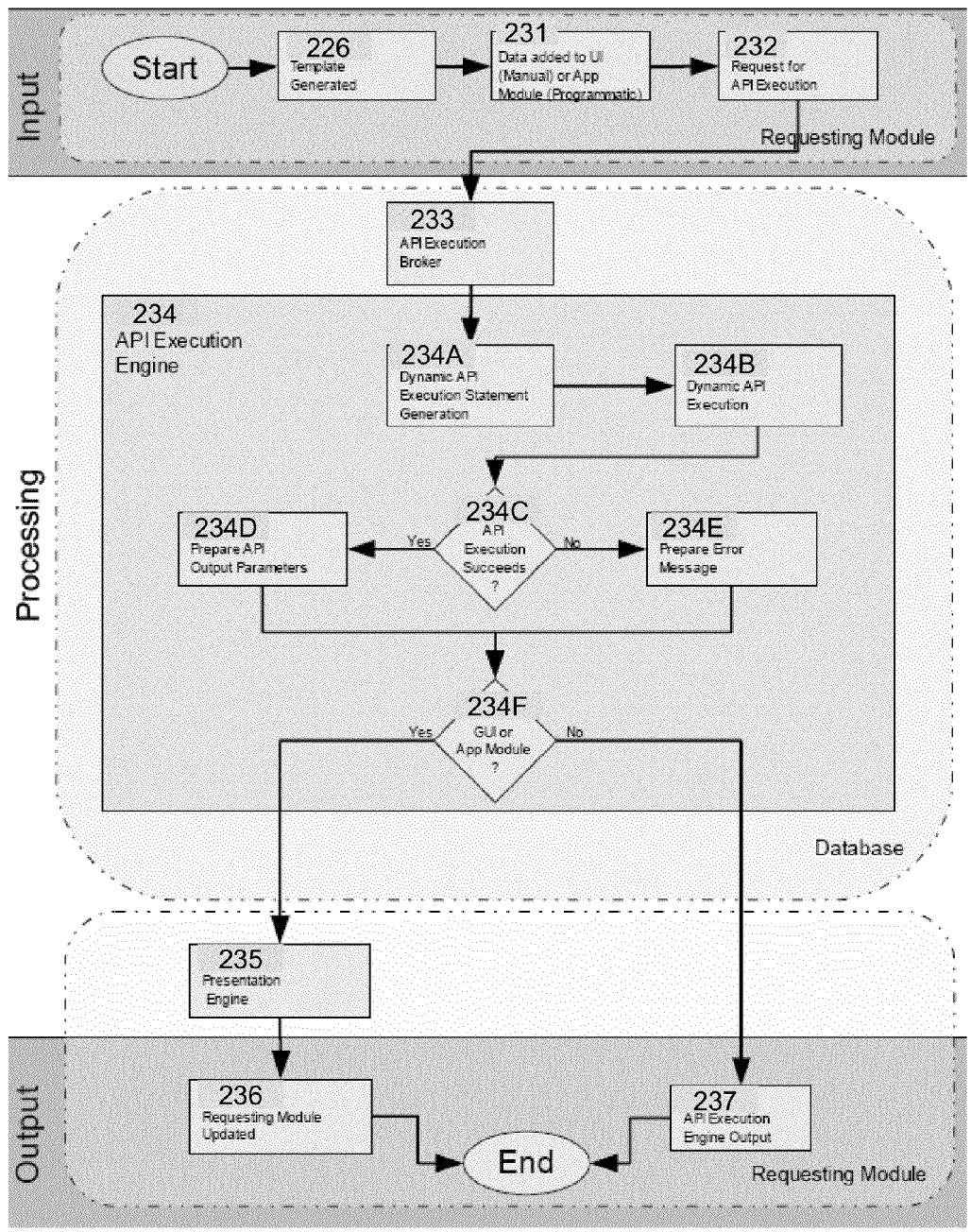
FIG. 6 is a flowchart depicting one embodiment of the API execution according to FIG. 1.

Referring now to FIG. 6, shown is a flowchart depicting one embodiment of the API execution according to FIG. 1. The API "loader" template 226 (also shown in FIG. 5) or a program with an API configuration included for a specific API may be used. In this process, data may be added 231 to the loader template. The adding of data is not a requirement as some procedures and functions do not require input parameters (e.g., reporting, etc.). Data added through an application module or custom program may be hardcoded (e.g., values in a specific database table, etc.) or generated by one or more queries resulting in the data to be included in the API call, although not limited thereto.

A request for API execution 232 may include the "target" API name, the loader template info 226, and the data 231, although not limited thereto. The specific loader template info may be passed at runtime or, if template definitions are stored on the database server, a template identifier may be used, although not limited thereto. An API execution broker 233 may format the data and make a procedural call to the API execution engine 234. The API execution engine 234 may dynamically build an API execution statement 234*a* for the targeted API using the data passed in 232 (e.g., the loader template or API configuration, any data, etc.).

The API execution statement 234*a* may be properly formatted for the target database, API, and the parameters and data passed. A later execution of the same API may result in a different execution statement. Any output parameters for the targeted API may be automatically included in the execution statement. The process of generating the API execution statement may comprise parsing the input data 232. Parameters with scalar data types may be assigned to the API execution statement 234*a*. If parameters with non-scalar data types are passed in XML, intelligent stringing or some other format other than a similar record type, these parameters may be read into memory, looped through, loaded into a single API parameter, and then added to the API execution statement 234*a*, although not limited thereto.

Once all of the necessary parameters have been added to the API execution statement 234*a*, the API may be executed 234*b*. The syntax for accomplishing may differ by database. For example, in Oracle this is accomplished by issuing an "execute immediate" command, which allows an API call from within a stored procedure. When the API execution 234*b* is complete, output parameters may be returned from the API to the API execution engine 234.

The system may determine if the API execution succeeded 234*c*. A successful API execution means that the API was successfully called, but may not take into consideration whether the API indicates a success or failure return status. At this point the system may prepare API output parameters 234*d*. The API output parameters may be formatted as required to be passed back to the request originator 232. For example, this may be in an XML format, a text/string format, etc., although not limited thereto. The system may prepare any error message 234*e*. This may include capturing error messages returned from the database and passing them back to the request originator 232. Again, this may be an XML format, a text/string format, etc., although not limited thereto.

The system may determine 234*f* whether the output can go directly from the API execution engine 234 to the requesting module 236 (e.g., this may be the case for a custom program or some other application not managed by the invention, etc.) or if it is a dynamically created GUI or application module created (e.g., template 226, etc.), in which case the process may move to the presentation engine 235. The presentation engine 235 may receive the output and format the data in accordance with the requirements of the requesting program. For a user interface form, for example, this may include updating each request record with its associated output parameters. For an application module, for example, this may include preparing the data in a specialized format if required. Once the requested module is updated 236, the output parameter data, if any, may be saved or discarded. The API execution output parameters may also be passed 237 directly to the calling program without the presentation engine formatting the output.

The following provides an example of how this works in an Oracle database. However, the same logic applies to other databases, though the specific implementation might differ, and the present teachings are not limited to any particular embodiment disclosed herein.

The API Name may be passed to the definition engine as owner.package_name.procedure_name. The routine may break this into three components (this information could also be passed as individual parameters) and put the value of each component into memory variables: schema_name (owner); pkg_name (package name); proc_name (procedure name).

p_get_api_metadata
    INPUT Parameters
        a) api_name
    OUTPUT Parameters
        a) INPUT Parameters XML
        b) OUTPUT Parameters XML The system may load the data dictionary definition as metadata into table apiw_api_metadata. The definition doesn't need to be written to a table but this provides a meaningful performance improvement as this information will be used at other times in the software.

INSERT INTO appc.apiw_api_metadata (object_id, object_name, owner, procedure$, position#, sequence#, level#, argument, type#, type_subname, pls_type, in_out, creation_date, last_update_date) (SELECT object_id, object_name, owner, procedure$, position#, sequence#, level#, argument, type#, type_subname, pls_type, NVL (in_out, 0), SYSDATE, SYSDATE FROM dba_objects obj, sys.argument$ params WHERE obj.object_id=params.obj# AND obj.owner=UPPER (ip_schema_name) AND obj.object_name=UPPER (ip_pkg_name) AND procedure$=UPPER (ip_proc_name));

The data dictionary definition generated and stored in the apiw_api_metadata table may be further processed, for example, for presenting the metadata definition to the requestor. Each parameter of the API may be evaluated through an algorithm (discussed further below) and then the system may add the final definition to a variable. Before starting the loop through the API parameters, it may add standard environment initialization parameters to the APIs metadata definition. The same process may be applied to any enterprise resource planning (ERP) or other application with special parameters that can be set before or included in an API call.

The program may loop through all of the "INPUT" and "OUTPUT" parameters (e.g., using a cursor, etc.) and each parameter may be evaluated individually. 'INOUT' parameters may be processed as part of both the INPUT and OUTPUT processing, although not limited thereto. This allows the logic to determine if each parameter is a scalar or non-scalar datatype and to perform metadata tagging for non-scalars. Non-scalar data types may be represented in a special way in the data-dictionary, which may identify the parameter name and then name the parameter sub-types (e.g., the sub-parameters within an API Parameter, etc.). For example, an API parameter might be "p_adj_rec", a record-type that consists of multiple scalar sub-type parameters such as "gl_date", "adjustment_number", etc.

When a parameter is identified as a scalar parameter, it may be processed as follows:

--Cursor for input parameters
CURSOR csr_api_input_parameters (ip_pkg_name IN VARCHAR2, ip_proc_name IN VARCHAR2, ip_schema_name IN VARCHAR2) IS SELECT*FROM dba_objects obj, sys.argument$ args WHERE obj.object_id=args.obj# AND obj.object_name=UPPER (ip_pkg_name) AND obj.owner=UPPER (ip_schema_name) AND args.procedure$=UPPER (ip_proc_name) AND (args.in_out=2 OR args.in_out IS NULL) ORDER BY sequence# ASC;

--Cursor for output parameters
CURSOR csr_api_output_parameters (ip_pkg_name IN VARCHAR2, ip_proc_name IN VARCHAR2, ip_schema_name IN VARCHAR2) IS SELECT*FROM dba_objects obj, sys.argument$ args WHERE obj.object_id=args.obj# AND obj.object_name=UPPER (ip_pkg_name) AND obj.owner=UPPER (ip_schema_name) AND args.procedure$=UPPER (ip_proc_name) AND (args.in_out=1 OR args.in_out=2) ORDER BY sequence# ASC;

The same logic may be used to process input and output parameters. The "definition" resulting from above exemplary cursors may be evaluated to determine the type of the parameter. This allows the categorization of the parameter as either a scalar or non-scalar. Non-scalars may be further categorized into table-types or record-types (e.g., row-types and arrays, etc.). There may be n number of levels; for example, a table-type parameter comprised of table-types, record-types, etc. The second level parameters can be comprised of table-type or record-types, although not limited thereto. This can be determined by reviewing the results of the "definition". By ordering the cursor using "sequence#", non-scalars can be easily identified. For example, a record-type parameter can be identified when the parameter type is "250" and the level# of the subsequent record in the definition increases by 1. All of the subsequent records in the definition with the same level# as the subsequent record may be part of that structured record type. The same logic can be used to identify table types and also handle any level of nested data structures.

As each API parameter (e.g., parameter in the definition with a level# of '0', etc.) and all of its sub-type parameters (e.g., parameter that is a child of a parameter with a level# of '0', etc.), if any, are processed, a temporary definition variable is updated. If the parameter processed is a scalar parameter, then the definition may include the parameter name and the datatype. If the parameter processed is a non-scalar, record-type parameter, then the record name, subtype name, and subtype datatype may be added to the definition. If the parameter being processed is a non-scalar, table-type parameter, then the table name, subtype name (if any), and table or subtype datatype may be added to the definition. Any non-scalar subtype may have at least one subtype parameter that is scalar (e.g., the logic may be iterative, so there can be n number of nested parameters, where n is any number).

The logic described is able to provide a logical representation of the API and its parameters to the calling routine. From the perspective of a program or user working with an API, record and row-type parameters can be presented as a number of individual scalar parameters. Table-type parameters can also be presented in this way, however the fact that they belong to a table is significant because the calling routine or user can pass multiple logical records. The same process may be used for INPUT, INOUT, and OUTPUT parameters, although not limited thereto. When all of the parameters have been processed, the temp_variable can be assigned to a final output parameter, which may be a clob (character large object) or another datatype which can support the large number of characters that may be included in the definition.

Dynamic API execution statement generation (shown as 234a in FIG. 6) may comprise the following tasks, although not limited thereto: dynamic API execution statement generation; dynamic API execution; and, dynamic API output parameter processing. API name, API parameters and API data may be input, although not limited thereto. It may be preferable to only send the data and not the API parameters if the API parameters and data would always be passed in a pre-arranged sequence. However, in order to allow the ordering of the parameters to be completely dynamic, all of these parameters may be used. API output message(s) and program output may be the output parameters, although not limited thereto.

Every API may have its own, specific parameters. The number, types, and names of an API's parameters are all variables from the perspective of the API execution engine. Since some or all of these parameters may be manipulated in the engine code, variables may be assigned to handle them. This may be handled by creating a large number of "generic" variables of each data type which could be used to store API parameter values. One approach is to dynamically create global variables for any API executed by the API engine. In an Oracle DB, for example, this could be accomplished with a pl/sql package.

An evaluation may occur during each execution of a given API to see if the global variables have already been created (and if they are current), although not limited thereto. If they are not, then the dynamic variable package may be created (or recreated). In the Oracle DB, this program may read the data dictionary and user_source to create parameters not defined in detail in the data dictionary (e.g., %type, %rowtype, etc.). A dynamically generated variable program (e.g., pl/sql package in Oracle, etc.) may be created for each API executed. There are other options, such as including all of the variables in one package, but having one dynamically created package per API may be preferable.

One of the components may allow for "parameter mapping". This may, at times, be referred to herein as "parameter aliasing" or "aliasing". At a high-level, this means that parameters and data can be passed to the API engine, which may be translated before including in the API call. This allows the parameter name defined by the database (e.g., table field, API parameter name, etc.) to be presented in the user interface by another name. Another name may be preferable if, for example, users are used to referring to customer names by "Client Name" whereas this data may be stored in the database in a field called "cust_name". Aliasing provides additional customization and the ability to simplify the user interface for end-users.

As an example, many APIs will require an internal identifier, like a customer ID, which a user may not know. The user may prefer to use a field name that is familiar to them, like Customer Name or Customer Number (which is different than Customer ID). The system may have predefined mapping rules that tell how to derive the parameter that the API needs based on the data a user wants to enter. So, if a user passes Customer Name, a rule may be defined that instructs that when a Customer Name is passed, use that plus the mapping rules to derive the Customer ID and pass the customer ID to the API. A user of the system would most likely not even be aware that this is happening behind the scenes. Mapping rules may be predefined in the system or defined by system users or administrators as needed, although not limited thereto.

In order to support this, additional variables may be needed. This may be handled by creating a large number of "generic" variables of each data type which could be used to store API parameter values. One approach is to dynamically create the required global variables by generating a variable program (e.g., a pl/sql package in Oracle DB, etc.) for all parameters that are defined in the parameter aliasing tables. This may be a single API package. The API engine may check to see if this package is current by comparing its date stamp against the data in the parameter aliasing tables. If it is not current, then it may be regenerated.

The API engine may accept the parameters (e.g., actual or mapped, etc.) and data in a single input parameter, although not limited thereto. One alternative is to have many parameters and each API parameter and value could be passed in its own parameter. While this has some benefits, it also has the drawback of making the internal processing more complex and, because the number of parameters required would not be known as it is dependent on the API and configuration of the API, a large number of parameters would need to be defined for each potential datatype. A varchar datatype may be used, although in order to support large datasets and every possible datatype, a clob variable may be preferable. The specific approach is not critical as all that is desired is a mechanism for accepting the data the requestor wishes to use in the API call.

Using the input string, the API engine may be able to distinguish between the parameters and their data. As mentioned before, one approach is using a pre-arranged sequencing of the parameters. However, it may be preferable to be dynamic and so it may be a preferable to embed logic which will tell the API engine how to interpret the input. There are multiple ways to accomplish this, including using xml whereby the parameters and data may be tagged. Another approach is to use delimiters that identify the separation between fields, records, and tables. The fields used as delimiters may be set and hardcoded. However, a preferable approach may be to have them in a separate file that could be configurable by the user. If the latter approach is used, then variables can be assigned the values that are defined outside this program.

In order to work with an API, it is helpful to understand its parameters and their data types. A separate procedure (or subprocedure, etc.) may support this process. Although the API engine could identify this information during each execution, a performance improvement occurs when the definition for a given API is stored in a database. Whenever the API engine is executed, it may check to see whether there is a current definition for the given API in the definition table, which may be referred to as the API metadata table. If the definition does not exist or is not current, it may be created or recreated.

Once all of the variables have been assigned and the API definition is loaded, the API engine may begin processing the input string. The input string may contain all of the parameters and data and there could be any number of parameters to process. A parsing routine may loop through the input string, processing the data as it goes and assigning it the call string (e.g., the variable that will eventually be used in the actual API call, etc.) or setting it aside for further processing. As discussed herein, the terms "record parameter" and "record variable" include any type of single-row, non-scalar datatype and the terms "table parameter" and "table variable" include any multi-row, non-scalar datatype.

BEGIN LOOP a. Reset all input processing variables b. Get API parameter name from the input xml string. There is more than one approach here but the objective is to read the input string and get the current API parameter name. This may be accomplished by substringing the input variable, starting with the current position, and using an 'INSTR' function or something similar to identify the 'field delimiter', which is used to separate parameters from their data.

In the example below, v_parameter_name is the variable in which the current parameter name will be stored; cv_temp_input_xml is a temporary variable which holds the input xml or string (it is modified as the engine works through the loop); v_field_delimiter is a variable which holds the string which represents the field delimiter in the input string.

v_parameter_name:=
SUBSTR (cv_temp_input_xml, 1, (INSTR (cv_temp_input_xml, v_field_delimiter)−1));
EXIT WHEN v_parameter_name IS NULL;

In this case, the string is being read up to the space before the first field delimiter that it runs into.

c. Advance the input string to the next logical point after the field delimiter. There are multiple ways to approach this, including just tracking the current position in the string. A preferable approach is substringing the temporary input string to exclude the parameter that was previously read and the field delimiter.

cv_temp_input_xml:=
SUBSTR (cv_temp_input_xml, (INSTR (cv_temp_input_xml, v_field_delimiter)+v_field_delimiter_size));

The new string will exclude the values already parsed. The next value in the string will be the data for the parameter that was just processed.

d. Determine parameter type (scalar, record, or table). Before processing parameter data, the current parameter may be evaluated to determine whether it is a scalar or non-scalar datatype. This affects how the data needs to be processed prior to adding to the dynamic API execution statement. The current API name may be stored in the field v_parameter_name. It is possible to achieve the same results without requiring the API engine to read the parameter type from the input string, since this can be determined by querying the data dictionary or a custom API definition table. However, performance is maximized by having this data passed by the calling application. If the current parameter is a record or table type (e.g., non-scalar type), then the record or table type delimiter may appear in the call string before the field delimiter. If the field delimiter appears before a record or table delimiter, then the current API parameter may be scalar.

A check may be performed to determine if the current parameter is a record or a table. This may be accomplished by checking to see if the record delimiter is within the current v_parameter_name:

IF INSTR (v_parameter_name, v_record_delimiter)< >0
THEN Parameter is a record e. If parameter is a record, the following logic may be executed.

v_record_name:=
SUBSTR (v_parameter_name,1,(INSTR (v_parameter_name, v_record_delimiter)−1));

Since record types will have sub-types (e.g., record field name, etc.), that can be identified as the value between the record delimiter and the field delimiter.

v_record_field_name:=
SUBSTR (v_parameter_name,(INSTR (v_parameter_name, v_record_delimiter)+v_field_delimiter_size));

After the record field (e.g., sub-type) has been identified, a check may be performed to determine if this is the first time the current execution has encountered this record. The reason for this is that the first time the record is encountered, it may be preferable to initialize a variable to support it. If the record has not been previously processed, then a variable for that record-type may be created. This may be a one-time task per record-type parameter. Hence, if this record-type has multiple sub-types, this variable may only be created the first time the record-type is encountered as the input parameters are processed. The variable may be dynamically created by using the dynamic variable package name and the record_name (which was created as a variable in the dynamic variable package).

v_record_init_string:=
  'BEGIN'
  || v_dyn_pkg_name
  || '.'
  || v_record_name
  || ':='
  || v_dyn_pkg_name
  || '.'
  || SUBSTR (v_record_name, 1, 28)
  || '_i; END;';
  EXECUTE IMMEDIATE v_record_init_string;
  Where:
  v_dyn_pkg_name=Dynamic package name (unique for each API)
  v_record_name=Record parameter being processed
The following values may be used:
v_dyn_pkg_name=dynamic100
v_record_name=parameter1 v_record_string:=
  'BEGIN dynamic100.parameter1:=dynamic100.parameter1_i; END;'

This ends the conditional logic if the current parameter is a record type.

f. If the parameter was not a record-type, it may next be evaluated to see if it is a table type. This may be accomplished by checking the current value in v_parameter_name for either the table delimiter (v_table_delimiter) or the table-row delimiter (v_table_row_delimiter). For the purposes of this evaluation, there are multiple types of tables. One type is a table of a scalar datatype, for example, a table of numbers, a table of varchars, or a table of dates. In this case, the parameter may simply be the table name. Another type of table is a table of record or row types. These parameters may include not only the table parameter but also the subtype parameter. The check for a table or table field may be performed as follows:

IF INSTR (v_parameter_name, v_table_delimiter)< >0
  OR INSTR (v_parameter_name, v_table_row_delimiter) < >0 THEN If the current parameter is not a table or table row, then move on to the next part (section g). If the parameter is a table or table row, then continue:

i. Get the row number. All table type parameters should include a row number. The row number may be determined so that it can be passed to the API during API execution. The row number may be passed with the input data, so it merely requires reading the input string between the table-row delimiter and the table or field delimiter.

ii. Get the table type parameter name and the table-type field (sub-type) name (if the table is of a record or rowset).
For table of rows or records:
v_table_name:=
  SUBSTR(v_parameter_name, 1,
    (INSTR (v_parameter_name,
    v_table_row_delimiter)−1));
v_table_field_name:=
  SUBSTR (v_parameter_name,
    (INSTR (v_parameter_name,
    v_table_delimiter)+v_table_delimiter_size));
v_parameter_name=the parameter currently being processed
v_table_row_delimiter=the delimiter being used to identify the table row
v_table_delimiter=the delimiter being used to identify the table
v_table_delimiter_size=the number of characters comprising the table delimiter
For table of scalar:
v_table_name:=
  SUBSTR (v_parameter_name, 1,
    (INSTR (v_parameter_name,
    v_table_row_delimiter)−1));
v_table_field_name:=null;

iii. Determine whether this table has already been processed.
v_table_exists:=f_in_record_names (v_table_lst, v_table_name);
v_table_lst is the current list of tables that has been dynamically build and
v_table_name is the name of the current table parameter being processed.

This may loop through the values in v_table_lst to see if the value stored in v_table_name is in the list. If the current table-type parameter is in the list, do nothing. Otherwise, it may be added to the list and initialized.

Update variables, including updating the v_table_lst, which stores all of the tables identified thus far.
    v_row_number:=1;
    v_table_name_of_subscripts
      :=v_table_name
      || '('|| v_row_number||')';
    v_table_lst.EXTEND;
    v_table_lst (v_table_lst.LAST):=v_table_name;
Next, initialize the variable for storing the table type parameter values:
    v_table_int_string:=
      'BEGIN'
      || v_dyn_pkg_name
      || '.'
      || v_table_name
      || '.DELETE; END;';
    EXECUTE IMMEDIATE v_table_init_string;

This may conclude the processing for table-type parameters.

g. If the API parameter is not a record or a table (or some other non-scalar datatype, etc.), then the parameter is of a scalar datatype.

h. At this point, the parameter name has been fully parsed and it is known whether the parameter is a scalar parameter or a non-scalar parameter (e.g., record or rowtype parameter, or a table type parameter, etc.). If it is a table type parameter, the row number is also known. Now, parse the data value for that parameter. It may assign the parameter value to the parameter called v_parameter_value. v_parameter_value may be set to the value between the current field delimiter and the next field delimiter.

Now it can do some different processing depending on whether it is a record, table, or scalar parameter. The first task is to determine whether or not the current parameter is an actual API parameter or if it is a "mapped" parameter. The parameters of many APIs are internal identifiers rather than fields that software users are familiar with. For example, a user might know their customers' "customer number" and "customer name" but would not know the internal field "customer id" used by the Oracle ERP system. If an API uses the "customer id" parameter, then it will be more difficult for the user to interact with the API.

"Mapped Parameters" can be defined which map user-known fields like "customer number" and "customer name" to the internal fields such as "customer id". The fields can be mapped on a general level (the mapping applies for any API), at an API level (the mapping applies to a specific API), or at a user/API level (the mapping applies to a specific API for a specific user), although not limited thereto.

These mappings can be defined at install time or at any other point. If it is a mapped parameter, then it is added to a variable to keep track of mapped parameters. It may be evaluated later in the program. The reason for this is that there can be a one to many mapping between the API parameter and the mapped parameter. So, while we may know that the current parameter is a mapped parameter, we do not necessarily have all of the mapped parameters needed for the parameter translation until we loop through all of the input string.

Records and tables of records may have more than one subtype parameter mapped. The final assignment of all of the record subtypes to the record variable that will be used in the call string may occur after the entire input string has been processed. At this point, assignment of the parameter value to the global variable for the appropriate record and sub-type parameter may be as follows:
    v_values_assign_stmt:=
      'begin'
      || 'APIW_MAPPED_VARIABLE_DECL'
      || '.'
      || v_record_field_name
      || ':='
      v_parameter_value
      || '; END;';
    EXECUTE IMMEDIATE v_values_assign_stmt;

This may end the logic for mapped record and row types. Unmapped records and row types may be evaluated later.

i. The same logic may be applied to table types, keeping in mind that table types can be tables of records and row-types or tables of scalar types. The general logic may be the same but row numbers may also be taken into account, although not limited thereto.

j. Once table types have been processed, scalar data types may be processed. The same processing may occur for a scalar parameter as would occur for a record sub type parameter, with the exception that the scalar parameter may be assigned directly to the call string if it is not mapped, since there will be no additions to it later in the API input string.

k. The next logical task may be to get the parameter datatype. For "mapped" parameters, these have already been identified and the mapped parameter value formatted appropriately. This logic occurs in the section above for the mapped parameters. The explanation here applies both to the formatting of the mapped parameter values and the non-mapped parameter values.

l. Now the non-mapped parameters may be formatted. A cursor for identifying the datatype may be called. The parameters passed may be slightly different depending on the parameter datatype. The cursor may read from the table that stores the API definition (this could also be determined at runtime by querying the data dictionary but for performance reasons it may be advisable to save this in a table). Once the datatype has been determined, assign it to variable v_parameter_datatype. Next, format the non-mapped parameter value. For example, varchar parameter values may be placed within quotes, dates formatted as needed, etc.

m. At this point, the parameter type is known and the parameter value has been formatted. Now the parameter value may be assigned to an in-program variable based on the dynamic variable package described earlier. For example, this would be the format for a scalar variable.
    v_values_assign_stmt:=
      'begin'
      || v_dyn_pkg_name
      || '.'
      || v_parameter_name
      || ':='
      || v_parameter_value
      || '; END;';
    EXECUTE IMMEDIATE v_values_assign_stmt;

Where 'v_dyn_pkg_name' is the name of the dynamically created variable package, 'v_parameter_name' is the name of the parameter currently being processed, and 'v_parameter_value' is the actual parameter value, with any necessary formatting. Another example for a record:
    v_values_assign_stmt:=
      'begin'
      || v_dyn_pkg_name
      || '.'
      || v_record_name
      || '.'
      || v_record_field_name
      || ':='
      || v_parameter_value
      || '; END;';

Here the record name and record field name are added. By doing this, the record variable will ultimately have all of the value for its subtypes by the time the loop processing the input parameter is complete. Example for table of scalar:
```
v_values_assign_stmt:=
    'begin'
    || v_dyn_pkg_name
    || '.'
    || v_table_name_of_subscripts
    || ':='
    || v_parameter_value
    || '; END;';
```
Example for table of row or records:
```
v_values_assign_stmt:=
    'begin'
    || v_dyn_pkg_name
    || '.'
    || v_table_name_of_subscripts
    || '.'
    v_table_field_name
    || ':='
    || v_parameter_value
    || '; END;';
END IF;
```
If the current parameter is scalar and not a mapped parameter, it may be added to the call string. The call string represents the dynamically generated API call string that is executed in order to run the API. This may be the end of the input processing loop.

Once the Input processing loop has completed and all input has been processed, record and table-type parameters that are not "mapped parameters" can be added to the dynamic API call. First, it may check to see if there are any record type parameters in the input string. If so, then it may append them (just the record parameter name) to the call string.
```
IF v_record_lst.COUNT>0
THEN
    FOR record_counter IN
        v_record_lst.FIRST. v_record_lst.LAST
    LOOP
        v_call_string:=
        v_call_string
        || v_record_lst (record_counter)
        || '=>',
        || v_dyn_pkg_name
        || '.'
        || v_record_lst (record_counter)
        || ',';
    END LOOP;
END IF;
```
It may do the same thing for table parameters:
IF v_table_lst.COUNT>0 THEN. . . .

Now the "mapped" parameters may be processed. A mapped parameter can be a scalar parameter, a sub-type of a record, a table of scalar, or a sub-type of a record that is part of a table, although not limited thereto. As the input processing was taking place, it identified the parameters that were "mapped" and added them to a table for processing (e.g., could have added to a program variable instead, etc.).

Now loop through the table with the mapped parameters. The logic for the parameter mapping may be as follows, although not limited thereto: one or more "user" parameters may be defined which map to a single API parameter. A set of mapping tables may maintain the relationships between the user parameters and the API parameters. As it loops through the cursor and encounters the first mapped parameter, do a lookup against the mapping tables to get the following information: the name of the API parameter to which the current "mapped parameter" is mapped; the names of any other "mapped parameters" which are part of the mapping to derive the API parameter; the tables in the database which will be queried to derive the API parameter value based on the "mapped parameter" values; and, the "Where" condition that will be used to derive the API parameter value based on the "mapped parameter" values.

Once all of the needed input is determined, create a dynamic SQL statement that is executed using the logic from the parameter mapping tables and the values in the mapped parameters to derive the API parameter value.
```
v_values_assign_stmt:=
    'SELECT'
    || rec_alias_mapping.id_parameter
    || CHR(10)
    || rec_alias_mapping.from_tables
    || CHR(10)
    || v_mod_where_clause;
EXECUTE IMMEDIATE v_values_assign_stmt
    INTO rec_alias_mapping.id_parameter_value;
```
Once this is done, the derived API parameter value may be assigned to a dynamically generated variable for the API parameter. If this is a scalar parameter, the API parameter and value can be directly assigned to the call string. If this is a record/rowtype or a table, then we may add it, using the sub-type parameter if applicable. Since multiple mapped parameters may be mapped to a single API parameter, it may keep track of the API parameters processed thus far in the loop so that it does not execute unnecessary queries as the other mapped parameters are encountered.

Now start processing API OUTPUT parameters. At this point, the "call string" (e.g., the dynamic API statement, etc.) includes all of the scalar and non-scalar IN and INOUT parameters for which data has been passed. Now add the API OUT parameters and any INOUT parameters which have not been processed yet (because there was no input data for them). These OUT parameters may or may not be updated by the API at the conclusion of its execution. It may go back to the table where the metadata definition for the API is stored (or it could query the data dictionary directly) to identify all of the OUT parameters and add them to the call string.

Then initialize the environment, if needed. Some ERP systems require environment initialization. For example, the Oracle EBS system requires two initialization routines using specific database programs (DBMS_APPLICATION_INFO.set_client_info and fnd_global.apps_initialize). This is an optional step and can be configured to work with any software application.

Next, execute the API (shown as 234b in FIG. 6). While processing the API parameters, the call string in the program variable 'v_call_string' has been built. Now that all of the preparation has been completed, it can execute the call string to run the API.

EXECUTE IMMEDIATE v_call_string;

At this point, the API has been executed. All that remains is to process the API output parameters 234d and package them into the API engine output parameters, along with any engine specific messages, so that they can be returned to the calling application. Logically, this is sort of the opposite of the input parameter processing. The output variables have been populated by the API and now the engine may take that output and create an output string which is similarly formatted to the input string already processed.

Unmapped, scalar parameters may be added to the string straight away. Unmapped records/rowtypes and table-types may be looped through on a sub-type by sub-type and/or row by row basis and formatted into the output string. Mapped output parameters may follow the same logic as mapped input parameters. A dynamic query may be built based on the mapping rules to translate the API parameter and value to a 'mapped parameter' and value.

Special checking may be performed to get the output for Oracle EBS APIs. In the Oracle EBS environment, many APIs write their messages out to a message buffer that is accessed using a package called fnd_msg_pub. If the API is using fnd_msg_pub, there may be parameters named x_msg_count and x_message data or p_msg_count and p_msg_data. The existence of one set of these parameters instructs whether to run the code for the special message. That special message handling requires reading the message buffer for output (fnd_msg_pub.get) in a loop based on the number in the parameter x_msg_count or p_msg_count. All of the message buffer output may be added to the engine output parameter string. The engine may also produce its own output indicating whether the API was successfully executed (which may be different than the API output regarding data validation processes).

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A computer system for interacting with a database on a server computer, the computer system comprising:
    an interface software in electronic communication with a user interface program executing on the computer, the interface software also in electronic communication with an application program interface (API) for the database;
    a builder process usable by the user interface program, the builder process configured by the interface software to have fields corresponding to parameters for the API, the fields displayed through the user interface program; and
    a loader process usable by the user interface program, the loader process configured by the interface software to have selected fields corresponding to fields selected on the builder process defining the configuration of the loader process, the selection made using the user interface program and the selected fields displayed through the user interface program;
    wherein the interface software builds an API execution statement using user data added to the loader process through the user interface program;
    wherein the interface software sends the API execution statement to the API for execution; and
    wherein the loader process provides an indication whether the API execution was successful through the user interface program.

2. The system of claim 1, wherein the user interface program comprises a spreadsheet program.

3. The system of claim 1, wherein the user interface program comprises a user form or web-based application.

4. The system of claim 1, wherein the loader process comprises a loader template.

5. The system of claim 1, wherein the builder process comprises a builder template.

6. The system of claim 1, wherein the interface software comprises a first interface software executing on the user computer and a second interface software executing on the server computer.

7. The system of claim 6, wherein the first interface software comprises a macro for the user interface program.

8. The system of claim 1, wherein the interface software authenticates a user by checking that the user has permission to execute the API.

9. The system of claim 1, wherein users are assigned one or more rights to execute the API with the interface software.

10. The system of claim 1, wherein information relating to the API execution is stored for later reference.

11. The system of claim 10, wherein the storing is selectively performed according to predetermined rules.

12. The system of claim 1, wherein the loader process comprises a loader template that changes a color of a row in the loader template depending upon whether a row data was successfully executed by the API.

13. The system of claim 1, wherein the interface software maps API parameter names to parameter name aliases used in the loader process.

14. The system of claim 1, wherein the API is for retrieving reporting information from the database and the loader process receives a plurality of data records in response to API execution.

15. The system of claim 14, wherein the loader process has a filter field used by the API to filter records.

16. A method for using a user computer to access information in a database on a server computer, the method comprising steps of:
    executing an interface software in electronic communication with a user interface program executing on the user computer, the interface software also in electronic communication with an application program interface (API) for the database;
    executing a builder process usable by the user interface program, the builder process configured by the interface software to have fields corresponding to parameters for the API, the fields displayed through the user interface program; and
    executing a loader process usable by the user interface program, the loader process configured by the interface software to have selected fields corresponding to fields selected on the builder process defining the configuration of the loader process, the selection made using the user interface program and the selected fields displayed through the user interface program;
    the method further comprising the steps of: building an API execution statement with the interface software, using user data added to the loader process through the user interface program;
    sending, from the user computer, the API execution statement to the API for execution; and
    providing an indication whether the API execution was successful through the user interface program.

17. The method of claim 16, wherein the user interface program comprises a spreadsheet program.

18. The method of claim 16, wherein the loader process comprises a loader template and the builder process comprises a builder template.

19. The method of claim 16, further comprising the steps of building a second API execution statement with the interface software, on the user computer, and sending, from the user computer, the second API execution statement to the API for execution, wherein the second API execution statement comprises a subset of the user data used to build the API execution statement.

20. The method of claim 16, wherein the API is for retrieving reporting information from the database, further comprising the step of receiving a plurality of data records with the loader process, on the user computer, in response to API execution.

21. The method of claim 20, further comprising the steps of building a second API execution statement with the interface software, on the user computer, and sending the second API execution statement, from the user computer, to the API for execution, wherein the API execution statement updates one or more data records received by the loader process in response to the first API execution.

22. The method of claim 16, wherein the database is an Oracle database.

23. The method of claim 16, wherein the user interface program is Microsoft Excel.

24. The method of claim 16, further comprising the step of committing the API execution to the database.

25. The method of claim 16, further comprising the step of storing parameters for the API for later use by the loader process.

26. A user computer system for interacting with a database on a server computer, the computer system comprising:

first interface software executing on the user the computer system and in electronic communication with a spreadsheet program executing on the user computer, the first interface software also in electronic communication with an application program interface (API) for the database;

second interface software executing on the server computer and in electronic communication with the database and the first interface software, the second interface software facilitating communication between the database and the first interface software;

a builder template usable by the spreadsheet program, the builder template dynamically configured by the first interface software to have fields corresponding to parameters for the API, the fields displayed through the spreadsheet program; and a loader template usable by the spreadsheet program, the loader template dynamically configured by the first interface software to have selected fields corresponding to fields selected on the builder template defining the configuration of the loader template, the selection made using the spreadsheet program and the selected fields displayed through the spreadsheet program;

wherein the first interface software builds an API execution statement using user data added to the loader template through the spreadsheet program;

wherein the first interface software sends the API execution statement to the API for execution;

wherein the first interface software receives output information from the API upon execution; and wherein the first interface software indicates on the loader template whether a row of data was successfully executed by the API.

27. The system of claim 26, wherein the server computer comprises a plurality of computers.

* * * * *